Jan. 5, 1971  W. B. SHRODE  3,552,228
REMOTE CONTROL MIRROR
Filed Oct. 14, 1968
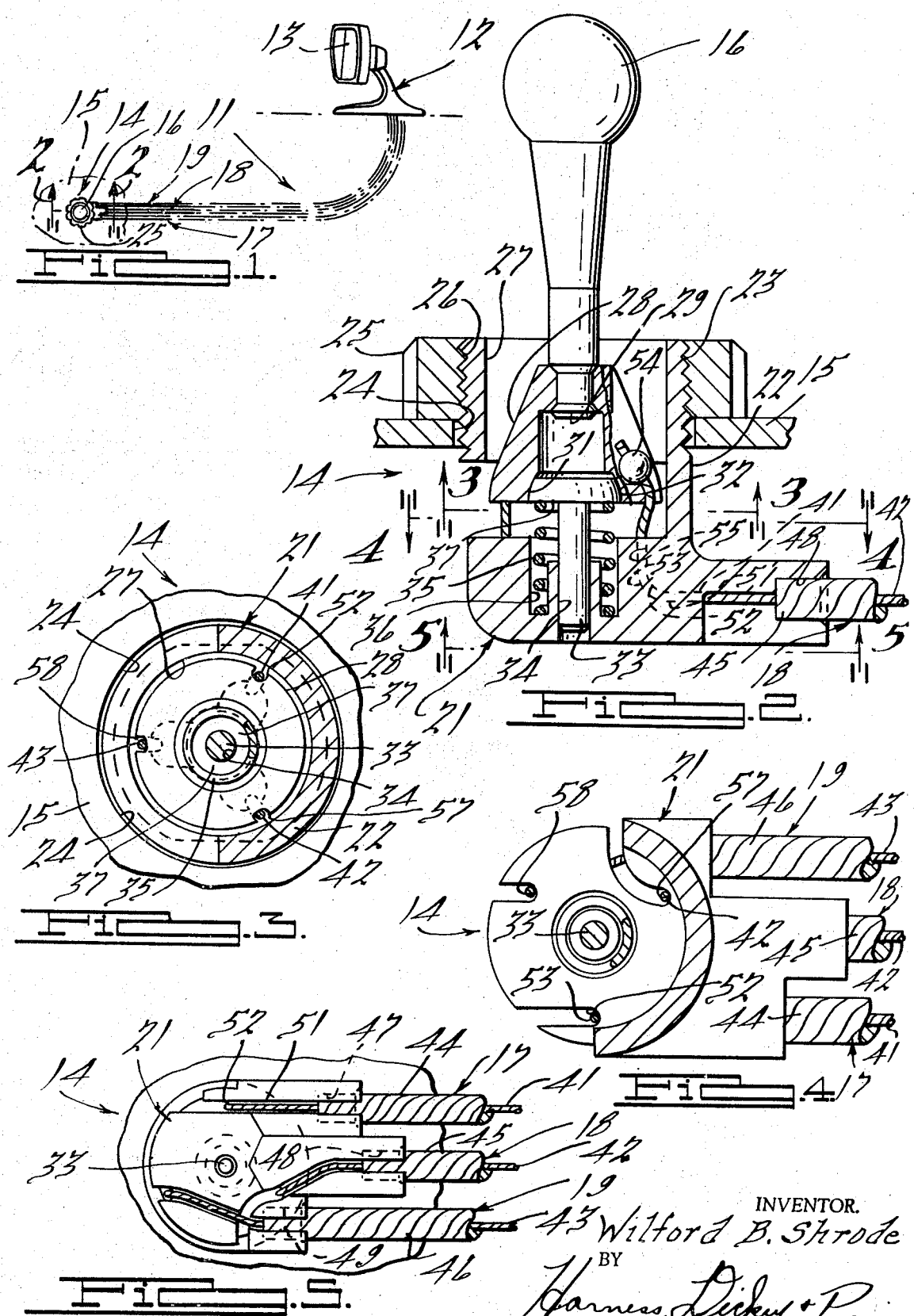
INVENTOR.
Wilford B. Shrode
BY
Harness, Dickey & Pierce
ATTORNEYS.

United States Patent Office 3,552,228
Patented Jan. 5, 1971

3,552,228
REMOTE CONTROL MIRROR
Wilford B. Shrode, Huntington Woods, Mich., assignor to C. M. Hall Lamp Company, a corporation of Michigan
Filed Oct. 14, 1968, Ser. No. 767,353
Int. Cl. F16c 1/10; G02b 7/18
U.S. Cl. 74—501  9 Claims

ABSTRACT OF THE DISCLOSURE

A remote controlled, rear view mirror for a motor vehicle. The mirror includes a universally pivotally supported mirror head, a control member supported for universal pivotal movement and a plurality of wire actuators for transmitting control movement from the control member to the mirror head. The control member is constructed to provide a compact assembly wherein the control wires are turned through a 90° angle by a guide surface formed integrally with a supporting member of the control member. In addition, the wire actuators are all disposed in substantially planar relationship after they have been turned through the right angle.

BACKGROUND OF THE INVENTION

This invention relates to a remote control mechanism and more particularly to an improved remote control mirror.

In the copending application of Douglas D. Liedel, entitled "Remote Controlled Device," Ser. No. 629,150, filed Apr. 7, 1967, which issued as U.S. Pat. No. 3,444,754 on May 20, 1969 under the title "Remote Controlled Motion Transmitting Device," and assigned to the assignee of this invention, there is disclosed a remote control mechanism wherein the wire actuators are turned through a substantial angle by guide surfaces for facilitating installation and for providing a compact assembly. The advantages of such a construction are described in detail in that application and will not be repeated here; but the discussion of the advantages therein is incorporated herein by way of reference.

Although the structure disclosed in the aforenoted application has considerable advantage, the individual wire actuators leave the control mechanism at different spacial relationships with respect to each other. With such a construction, the control mechanism, although more compact than the prior art, is nevertheless bulky. With the increased emphasis on maximum spacial utilization in vehicles, it is essential that a more compact assembly be provided. A more compact assembly will result if the control wires leave the control member in a coplanar relationship.

It is, therefore, a principal object of this invention to provide an improved remote control actuator.

It is a further object of this invention to provide a remote control actuator wherein the control wire is turned through substantially a right angle by a guide surface as it leaves the actuator.

It is another object of this invention to provide an improved compact remote control actuator wherein the control wires are turned through a substantial angle and into a planar relationship.

It is a yet further object of this invention to provide an improved remote controlled mirror.

BRIEF SUMMARY OF THE INVENTION

A remote control actuator embodying this invention is particularly adapted for transmitting motion to a remote controlled device and around a substantially right angle. The actuator comprises a supporting member, a control member and means on the control member and supporting member defining a ball and socket connection for pivotally supporting the control member upon the supporting member for universal pivotal movement. A plurality of guide surfaces are integrally formed by the supporting member at spaced locations. A plurality of wire actuators each has a first end portion connection to the control member at respectively spaced positions. Each of the wire actuators also has a first intermediate portion extending from the first end portion toward a respective one of the guide surfaces, a second intermediate portion extending from the first intermediate portion across the respective one of the guide surfaces, a third intermediate portion extending from the second intermediate portion and disposed at a substantially right angle to the first intermediate portion and a second end portion adapted to be connected to the remote device. A plurality of protective sheaths are provided with each of the sheaths encircling a major portion of the length of the third intermediate portion of a respective one of the wire actuators for guiding the contained part of the third intermediate portion for reciprocation. Means affix one end of each of the protective sheaths relative to the supporting member in spaced relationship from the respective guide surface in substantially the same plane as each other for establishing a coplanar relationship between the third intermediate portions of the wire actuators where they enter the one end of the protective sheaths.

BRIEF DESCRIPTION OF THE DRAWINGS

FIG. 1 is a side elevaional view of a remote controlled, outside, automotive rear view mirror embodying this invention.

FIG. 2 is an enlarged cross-sectional view of the control actuator taken along the line 2—2 of FIG. 1.

FIG. 3 is a cross-sectional view taken along the line 3—3 of FIG. 2.

FIG. 4 is a cross-sectional view taken along the line 4—4 of FIG. 4.

FIG. 5 is a reduced scale elevational view taken generally in the direction of the line 5—5 of FIG. 2.

DETAILED DESCRIPTION OF THE PREFERRED EMBODIMENT

Referring first to FIG. 1, a remote controlled, outside, automotive rear view mirror assembly embodying this invention, is identified generally by the reference numeral 11. The mirror assembly 11 includes a mirror head 12 that is adapted to be supported in any known manner on the exterior sheet metal of the associated vehicle. The mirror head 12 includes a mirror glass 13 and means for supporting the mirror glass 13 for universal pivotal movement. A control actuator, indicated generally by the reference numeral 14, is adapted to be mounted on a panel 15 of the interior of the car. The control actuator 14 includes a control lever 16, which is also supported for universal pivotal movement in a manner which will become more apparent as this description proceeds. A plurality of Bowden wire actuators 17, 18 and 19 interconnect the control actuator 14 with the mirror glass 13 for adjustment of the angle or position of the mirror glass.

Referring now in detail to the remaining figures, the control actuator is comprised of a supporting member, indicated generally by the reference numeral 21. The supporting member 21 may be formed as a zinc die casting, may be formed from plastic or may be made in any other suitable manner. The supporting member 21 has a generally cylindrical section 22 with male threads 23 formed at its outer end. The section 22 and threads 23 are adapted to be passed through a complementary opening 24 formed in the panel 15. A bezel 25 having female threads 26 is received upon the threads 23 and engages the panel 15. The bezel 25 holds the panel 15 against a shoulder (not shown) formed by the supporting member 21 to affix the supporting member 21 relative to the panel 15.

The supporting member section 22 is formed with a cylindrical opening 27 into which a portion of the control lever 16 extends. At its inner end, the control lever 16 is staked to a spider member 28, as at 29. The spider member 28 is formed with a socket cavity 31 that has a generally spherical shape. Received in the socket cavity 31 is a complementary surface 32 of a journal member. The journal member has a shank portion 33 that is slidably received in a bore 34 formed in a portion of the supporting member 21 at the base of the cylindrical section 22 and coaxial with it. A coil spring 35 encircles the shank portion 33 and engages an annular groove 36 formed in the supporting member 21 at one of its ends. The opposite end of the spring 35 bears against a shoulder 37 formed on the journal member between the portion 32 and shank 33 for urging the journal member away from the supporting member 21.

Each of the Bowden wire actuators 17, 18 and 19 is comprised of a control wire 41, 42 and 43 that is surrounded by a respective protective sheath 44, 45 and 46. The ends of the protective sheaths 44, 45 and 46 adjacent to the supporting member 21 are received in cylindrical openings 47, 48 and 49 formed in embossments of the supporting member 21 and are fixed, as by crimping in these openings. The openings 47, 48 and 49 lie in a common plane so that the ends of the protective sheaths 44, 45 and 46 are disposed in a coplanar relationship as are the contained portions of the control wires 41, 42 and 43.

The control wire 41 has a portion 51 that extends from the adjacent end of the protective sheath 47 toward an arcuate guide surface 52 formed integrally with the supporting member 21. A portion 53 of the control wire 41 extends across this guide surface 52 and extends toward and is affixed to the spider 28 in any known manner, as by means including a ferrule 54. The portion of the supporting member 21 adjacent the guide surface 52 is formed with a section 55 that is disposed at a substantially right angle to the wire portion 51 so that the wire is turned through approximately a 90° angle by the guide surface 52 and adjacent surfaces on the supporting member 21. The remaining control wires 42 and 43 are each trained across respective guide surfaces 57 and 58 formed integrally with the supporting member 21 and are connected at their outer ends to the spider 28 at circumferentially spaced locations with respect to the point of connection of the wire 41. In each case, the wires 42 and 43 are turned through a substantially right angle.

Thus, each of the control wires 41 and 42 and 43 has a first end portion fixed to the spider 28 and an intermediate portion comprised of a first portion that extends toward the supporting member 21, a second intermediate portion that extends across the respective guide surfaces 52, 57 or 58, and a third intermediate portion that extends into one end of the respective protective sheath 44, 45 and 46. These third intermediate portions are disposed in substantially coplanar relationship to each other and are turned at substantially a right angle with respect to the first intermediate portions. The opposite ends of each of the control wires 41, 42 and 43 are connected to a mirror glass 13 in any known manner at circumferentially spaced positions. It should be readily apparent, therefore, that pivotal movement of the control lever 16 will result in conjoint pivotal movement of the mirror glass 13. The operation of the coil spring 35 pretensions the control wires 41, 42 and 43 and maintains the journal member surface 32 in engagement with the spider surface 31.

What is claimed is:

1. A remote control actuator for transmitting motion to a remotely controlled device and around a substantially right angle, said actuator comprising a supporting member, a control member, means on said control member and on said supporting member defining a ball and socket connection for pivotally supporting said control member upon said supporting member for universal pivotal movement, a plurality of guide surfaces integrally formed by said supporting member at spaced locations, a plurality of wire actuators, each of said wire actuators having a first end portion connected to said control member, said first end portions of said wire actuators being connected to said control member at spaced positions, each of said wire actuators further having a first intermediate portion extending from said first end portion toward a respective one of said guide surfaces, a second intermediate portion extending from said first intermediate portion across the respective one of said guide surfaces, a third intermediate portion extending from said second intermediate portion and disposed at a substantially right angle to said first intermediate portion and a second end portion adapted to be connected to the remotely controlled device, a plurality of protective sheaths, each of said protective sheaths encircling a major portion of the length of the third intermediate portion of a respective one of said wire actuators and guiding the contained part of said third intermediate portion for reciprocation, and means for affixing one end of each of said protective sheaths relative to said supporting member in spaced relationship from the respective guide surface and with the longitudinal axes of said sheath ends lying in substantially the same plane as each other for establishing a substantially coplanar relationship between said third intermediate portions of said wire actuators where they enter said one ends of said protective sheaths.

2. A remote control actuator as set forth in claim 1 wherein the means for affixing one end of each of the protective sheaths relative to the supporting member comprises means formed integrally on said supporting member for receiving the one end of each of said protective sheaths.

3. A remote control actuator as set forth in claim 1 further including means for spring biasing said control member away from said supporting member for tensioning the wire actuators.

4. A remote control actuator as set forth in claim 1 wherein the supporting member includes integral means defining a cylindrical portion having an internal cavity into which a portion of the control member extends.

5. A remote control actuator as set forth in claim 4 wherein the cylindrical portion of the supporting member is externally threaded for affixing said supporting member relative to an associated supporting component.

6. A remote control actuator as set forth in claim 1 wherein the ball and socket connection is provided by means on the control member defining a socket opening and means supported by said supporting member having a surface complementary to said socket opening and received in said socket opening.

7. A remote control actuator as set forth in claim 6 wherein the means for affixing one end of each of the protective sheaths relative to the supporting member comprises means formed integrally on said supporting member for receiving the one end of each of said protective sheaths.

8. A remote control actuator as set forth in claim 7 wherein the supporting member includes integral means defining a cylindrical portion having an internal cavity into which a portion of the control member extends.

9. A remote control actuator as set forth in claim 8 wherein the cylindrical portion of the supporting member is externally threaded for affixing said supporting member relative to an associated supporting component.

References Cited

UNITED STATES PATENTS

| | | | |
|---|---|---|---|
| 3,094,582 | 6/1963 | Jacobson | 74—501X |
| 3,286,545 | 11/1966 | Malachowski | 74—501 |
| 3,407,683 | 10/1968 | Liedel | 74—501 |
| 3,444,754 | 5/1969 | Liedel | 74—501 |

MANUEL A. ANTONAKAS, Primary Examiner